United States Patent
Chuang

(10) Patent No.: US 12,519,632 B2
(45) Date of Patent: Jan. 6, 2026

(54) KEY STORAGE DEVICE AND METHOD FOR WRITING KEY VALUE INTO ONE-TIME-PROGRAMMABLE DEVICE

(71) Applicant: PUFsecurity Corporation, Hsinchu County (TW)

(72) Inventor: Kai-Hsin Chuang, Hsinchu County (TW)

(73) Assignee: PUFsecurity Corporation, Hsinchu County (TW)

(*) Notice: Subject to any disclaimer, the term of this patent is extended or adjusted under 35 U.S.C. 154(b) by 75 days.

(21) Appl. No.: 18/769,455

(22) Filed: Jul. 11, 2024

(65) Prior Publication Data
US 2025/0141677 A1    May 1, 2025

Related U.S. Application Data

(60) Provisional application No. 63/594,429, filed on Oct. 31, 2023.

(51) Int. Cl.
*H04L 9/08* (2006.01)

(52) U.S. Cl.
CPC ..................... *H04L 9/088* (2013.01)

(58) Field of Classification Search
None
See application file for complete search history.

(56) References Cited

U.S. PATENT DOCUMENTS 6,246,075 B1 * 6/2001 Su ............................ H01L 22/34
257/296
7,818,584 B1 * 10/2010 Joyce ..................... H04L 9/0894
713/189
9,768,957 B2 * 9/2017 Kumar ................... H04L 9/0866
(Continued)

FOREIGN PATENT DOCUMENTS

TW         202105226         2/2021

OTHER PUBLICATIONS

Kanno et al.; Wafer-Voltage Measurement in Plasma Processes by Means of a New Probe Method and an Impedance Monitor; Japanese Journal of Applied Physics; downloaded form scholar.google.com (Year: 2004).*

(Continued)

*Primary Examiner* — Kambiz Zand
*Assistant Examiner* — Mahabub S Ahmed
(74) *Attorney, Agent, or Firm* — Winston Hsu

(57) ABSTRACT

A key storage device and a method for writing a key value into an one-time-programmable (OTP) device are provided. The key storage device includes an energy harvester, a controller, a hardware key device and the OTP device. The energy harvester is configured to collect energy particles during a fabrication process of a wafer which includes the key storage device, in order to generate a regular voltage. The controller is configured to enable a key transfer procedure when the regular voltage reaches a predetermine level. The hardware key device is configured to provide a pre-existing key value. The controller reads the pre-existing key value from the hardware key device, and writes a key value into the OTP device according to the pre-existing key value. After the OTP device stores the key value, the controller erases the pre-existing key value within the hardware key device.

20 Claims, 3 Drawing Sheets

(56) References Cited

U.S. PATENT DOCUMENTS

| | | | |
|---|---|---|---|
| 10,284,368 B2 | 5/2019 | Li | |
| 12,047,502 B2* | 7/2024 | Demasi | H04L 9/0643 |
| 2004/0129952 A1* | 7/2004 | Griesmer | G11C 11/56 |
| | | | 257/202 |
| 2006/0059372 A1* | 3/2006 | Fayar | G06F 21/72 |
| | | | 713/192 |
| 2010/0189262 A1* | 7/2010 | Ducharme | H04N 21/4183 |
| | | | 706/47 |
| 2011/0002186 A1* | 1/2011 | Buonpane | G11C 17/18 |
| | | | 365/225.7 |
| 2011/0087898 A1* | 4/2011 | Williams | H04L 9/3236 |
| | | | 380/46 |
| 2014/0016776 A1* | 1/2014 | Van Foreest | G06F 21/73 |
| | | | 380/46 |
| 2014/0089659 A1* | 3/2014 | Brickell | G06F 21/73 |
| | | | 713/155 |
| 2014/0093074 A1* | 4/2014 | Gotze | G06F 21/73 |
| | | | 380/45 |
| 2014/0185795 A1* | 7/2014 | Gotze | H04L 9/0861 |
| | | | 380/44 |
| 2015/0036428 A1* | 2/2015 | Liu | G11C 16/0416 |
| | | | 365/185.03 |
| 2015/0261458 A1* | 9/2015 | Vauclair | G11C 17/165 |
| | | | 711/103 |
| 2016/0085955 A1 | 3/2016 | Lerner | |
| 2019/0158276 A1 | 5/2019 | Troutman | |
| 2019/0272176 A1* | 9/2019 | Raghuram | G06F 9/441 |
| 2019/0347446 A1* | 11/2019 | Chen | G06F 21/73 |
| 2020/0226296 A1* | 7/2020 | Pan | H04L 63/062 |
| 2021/0250759 A1 | 8/2021 | Ziv | |
| 2023/0082136 A1* | 3/2023 | Bae | G06F 21/602 |
| | | | 713/171 |
| 2023/0153252 A1* | 5/2023 | Park | G06F 12/1466 |
| | | | 711/164 |
| 2023/0359741 A1* | 11/2023 | Zhang | H04L 9/3247 |

OTHER PUBLICATIONS

Mark A. Sobolewski; Real-time, noninvasive monitoring of ion energy and ion current at a wafer surface during plasma etching; J. Vac. Sci. Technol. A 24, 1892-1905 (2006); downloaded from scholar.google.com (Year: 2006).*

Okigawa et al.; On-wafer monitoring of plasma-induced electrical current in silicon dioxide to predict plasma radiation damage; J. Vac. Sci. Technol. B 23, 173-177 (2005); downloaded from scholar.google.com (Year: 2005).*

Hong et al.; Fault Detection and Classification in Plasma Etch Equipment for Semiconductor Manufacturing e-Diagnostics; IEEE Transactions on Semiconductor Manufacturing, vol. 25, No. 1, Feb. 2012; downloaded form scholar.google.com (Year: 2012).*

Demetre J Economou; Pulsed plasma etching for semiconductor manufacturing; J. Phys. D: Appl. Phys. 47 (2014) 303001 (27pp); downloaded from scholar.google.com (Year: 2014).*

Kotaro Naruse, Takayuki Ueda, Jun Shiomi, Yoshihiro Midoh, Noriyuki Miura, "A Self-Programming PUF Harvesting the High-Energy Plasma During Fabrication", ISSCC 2023, IEEE, USA.

* cited by examiner

KEY STORAGE DEVICE AND METHOD FOR WRITING KEY VALUE INTO ONE-TIME-PROGRAMMABLE DEVICE

CROSS REFERENCE TO RELATED APPLICATIONS

This application claims the benefit of U.S. Provisional Application No. 63/594,429, filed on Oct. 31, 2023. The content of the application is incorporated herein by reference.

BACKGROUND OF THE INVENTION

1. Field of the Invention

The present invention is related to key storage in electronic devices, and more particularly, to a key storage device and a method for writing a key value into an one-time-programmable (OTP) device.

2. Description of the Prior Art

For fuse-like key storage, a key value is programmed during a register-transfer level (RTL) design phase, in order to make the key value exist in a chip when the chip is fabricated. The key value stored in the fuse-like storage may be visible by a hacker under a microscope, however. Some related arts may write the key value into invisible storage after the chip is fabricated, and therefore needs an additional secure environment to program the key value, which introduce additional manufacturing costs during the process.

Thus, there is a need for a novel key storage and an associated method, which can ensure the security of the key value without greatly introducing additional costs (e.g. the secure environment for program the key value after the chip is fabricated).

SUMMARY OF THE INVENTION

An objective of the present invention provides a key storage device and a method for writing a key value into an one-time-programmable (OTP) device, which can solve the problem of the related art without introducing any side effect or in a way that is less likely to introduce side effects.

At least one embodiment of the present invention provides a key storage device. The key storage device comprises an energy harvester, a controller, a hardware key device and an OTP device, where the controller is coupled to the energy harvester, the hardware key device is coupled to the controller, and the OTP device is coupled to the controller. The energy harvester is configured to collect energy particles during a fabrication process of a wafer which comprises the key storage device, in order to generate a regular voltage. The controller is configured to enable a key transfer procedure when the regular voltage reaches a predetermine level. The hardware key device is configured to provide a pre-existing key value. The controller reads the pre-existing key value from the hardware key device, and writes a key value into the OTP device according to the pre-existing key value. After the OTP device stores the key value, the controller erases the pre-existing key value within the hardware key device.

At least one embodiment of the present invention provides a method for writing a key value into an OTP device, where the method is applicable to a key storage device, and the key storage device comprises the OTP device. The method comprises: utilizing an energy harvester of the key storage device to collect energy particles during a semiconductor process of a wafer which comprises the key storage device, in order to generate a regular voltage; after the regular voltage reaches a predetermine level, utilizing a controller of the key storage device to read a pre-existing key value from a hardware key device of the key storage device; utilizing the controller to write the key value into the OTP device according to the pre-existing key value; and after the OTP device stores the key value, utilizing the controller to erase the pre-existing key value within the hardware key device.

The key storage device and the method provided by the embodiments of the present invention can make the key transfer procedure from the hardware key device to the OTP device be automatically enabled during fabrication of the key storage device, and the key value within the hardware key device is destroyed after the key transfer procedure is done. Thus, a hacker is unable to obtain the key value from the hardware key device by a microscope. In addition, a secure environment for manually programming the key value within the OTP device is not required. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
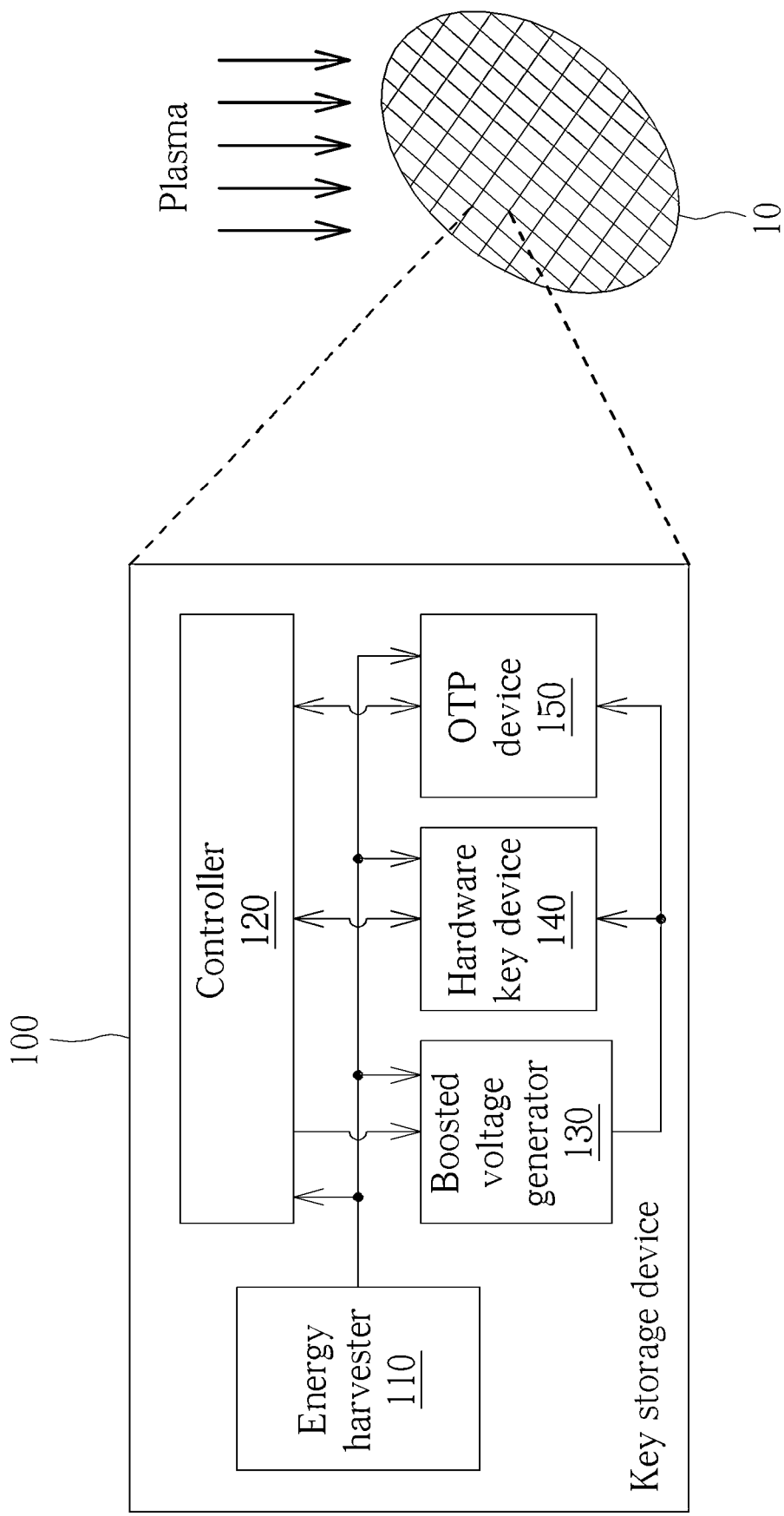
FIG. 1 is a diagram illustrating a key storage device fabricated on a wafer according to an embodiment of the present invention.

FIG. 1 is a diagram illustrating a key storage device 100 fabricated on a wafer 10 according to an embodiment of the present invention. As shown in FIG. 1, the key storage device 100 may comprise an energy harvester 110, a controller 120, a hardware key device 140 such as a metal key storage device or a fuse-like storage device and an OTP device 150, where the controller 120 is coupled to the energy harvester 110, the hardware key device 140 is coupled to the controller 120, and the OTP device 150 is coupled to the controller 120. The energy harvester 110 is configured to collect energy particles during a fabrication process (e.g. a semiconductor fabrication process) of the wafer 10 which comprises the key storage device 100, in order to generate a regular voltage. The controller 120 is configured to enable a key transfer procedure when the regular voltage reaches a predetermine level. The hardware key device 140 is configured to provide a pre-existing key value. The controller 120 may read the pre-existing key value from the hardware key device 140, and write a key value into the OTP device 150 according to the pre-existing key value. After the OTP device 150 stores the key value, the controller 120 may erase the pre-existing key value within the hardware key device 140.

The energy harvester 110 may derive energy from existing high-energy sources, and more particularly, from high-energy plasma in the semiconductor fabrication process. The plasma-based reactive ion etching (RIE) is one of well-known etching instruments in semiconductor fabrication, which emits high-energy plasma ions to process silicon and metal layers. Due to an antenna effect, currents introduced by the high-energy plasma ions can be strong, and the energy harvester 110 may collect the energy of these high-energy plasma ions, thereby serving as a stable power source for the key transfer procedure mentioned above.

The key storage device 100 may be implemented on previously fabricated metal layers, and the energy particles (e.g. the high-energy plasma ions) collected by the energy harvester 110 are configured for fabrication of at least one subsequently fabricated metal layer, where the previously fabricated metal layers are fabricated before the at least one subsequently fabricated metal layer. For example, the key storage device 100 may be implanted on a first metal layer to a sixth metal layer, where when the process enters fabrication of a seventh metal layer to an eighth metal layer, the key storage device 100 is already implemented on the wafer 10, and the high-energy plasma ions emitted for etching the seventh metal layer to the eighth metal layer may be collected by the energy harvester 110 to thereby generate the regular voltage. After the regular voltage reaches the predetermined level, operations of the controller 120 may automatically start up.

In this embodiment, the key storage device 100 may further comprise a boosted voltage generator 130 such as charge pump circuits, where the boosted voltage generator 130 is coupled to the controller 120 is configured to generate a boosted voltage according to the regular voltage when the controller 120 enable the key transfer procedure. For example, the controller 120 may send a corresponding command to the boosted voltage generator 130, and the boosted voltage generator 130 may generate the boosted voltage in response to this command. In this embodiment, the regular voltage provided by the energy harvester 110 may serve as a power supply of the controller 120, the boosted voltage generator 130, the hardware key device 140 and the OTP device 150, where the controller 120 may write the key value into the OTP device 150 with aid of the boosted voltage provided by the boosted voltage generator 130, and the controller may erase the pre-existing key value within the hardware key device 140 with aid of the boosted voltage provided by the boosted voltage generator 130. It should be noted that the boosted voltage utilized for writing the key value into the OTP device 150 and the boosted voltage utilized for erasing the pre-existing key value within the hardware key device 140 do not have to be the same. For example, the boosted voltage may comprises a first boosted voltage and a second boosted voltage, where the controller 120 may write the key value into the OTP device 150 with aid of the first boosted voltage and erase the pre-existing key value within the hardware key device 140 with aid of the second boosted voltage, but the present invention is not limited thereto.

In this embodiment, after the controller 120 writes the key value into the OTP device 150, the controller 120 may verify whether the key value read from the OTP device 150 matches the pre-existing key value read from the hardware key device 140. When the controller 120 verifies that the key value read from the OTP device 150 matches the pre-existing key value read from the hardware key device 140, the controller 120 may determine that the key value is correctly written into the OTP device 150. After the controller 120 writes the key value into the OTP device (more particularly, after the controller 120 determines that the key value is correctly written into the OTP device 150), the controller 120 may further programs a flag in the OTP device 150 to indicate completion of the key transfer procedure. Thus, if the controller 120 is powered up by the energy harvester 110 again during subsequent process flow(s), the controller 120 may skip the key transfer procedure in response to the flag read from the OTP device 150.

In this embodiment, after the OTP device 150 stores the key value (more particularly, after the controller 120 verifies that the key value stored in the OTP device 150 matches the pre-existing key value read from the hardware key device 140), the controller 120 may erase the pre-existing key value within the hardware key device 140 by programming all cells of the hardware key device 140 to be a same logic value (e.g. a logic value "1"), in order to prevent a hacker from obtaining the key value by a microscope. It should be noted that the hardware key device 140 may be a fuse-like storage device. For example, each of the cells of the hardware key device 140 is either in an initial state (which may be represented by a conductive path that introduces a short circuit) or in a final state (which may be represented by a fused path that introduces an open circuit), where the cells in the initial state may indicate a first logic value (e.g. a logic value "0") and the cells in the final state may indicate a second logic value (e.g. the logic value "1"), and each cell in the final state is unable to be reversed to the initial state. Thus, the controller 120 may read all cells within the hardware key device 140 to obtain the pre-existing key value (e.g. a pre-existing digital key value), and after the OTP device 150 stores the key value (more particularly, after the controller 120 verifies that the key value stored in the OTP device 150 matches the pre-existing key value read from the hardware key device 140), the controller 120 may programs all of the cells in the initial state to the final state (e.g. turning the conductive paths into fused paths with the aid of the boosted voltage). That is, the pre-existing key value in the hardware key device 140 may be destroyed.

Figure 2:
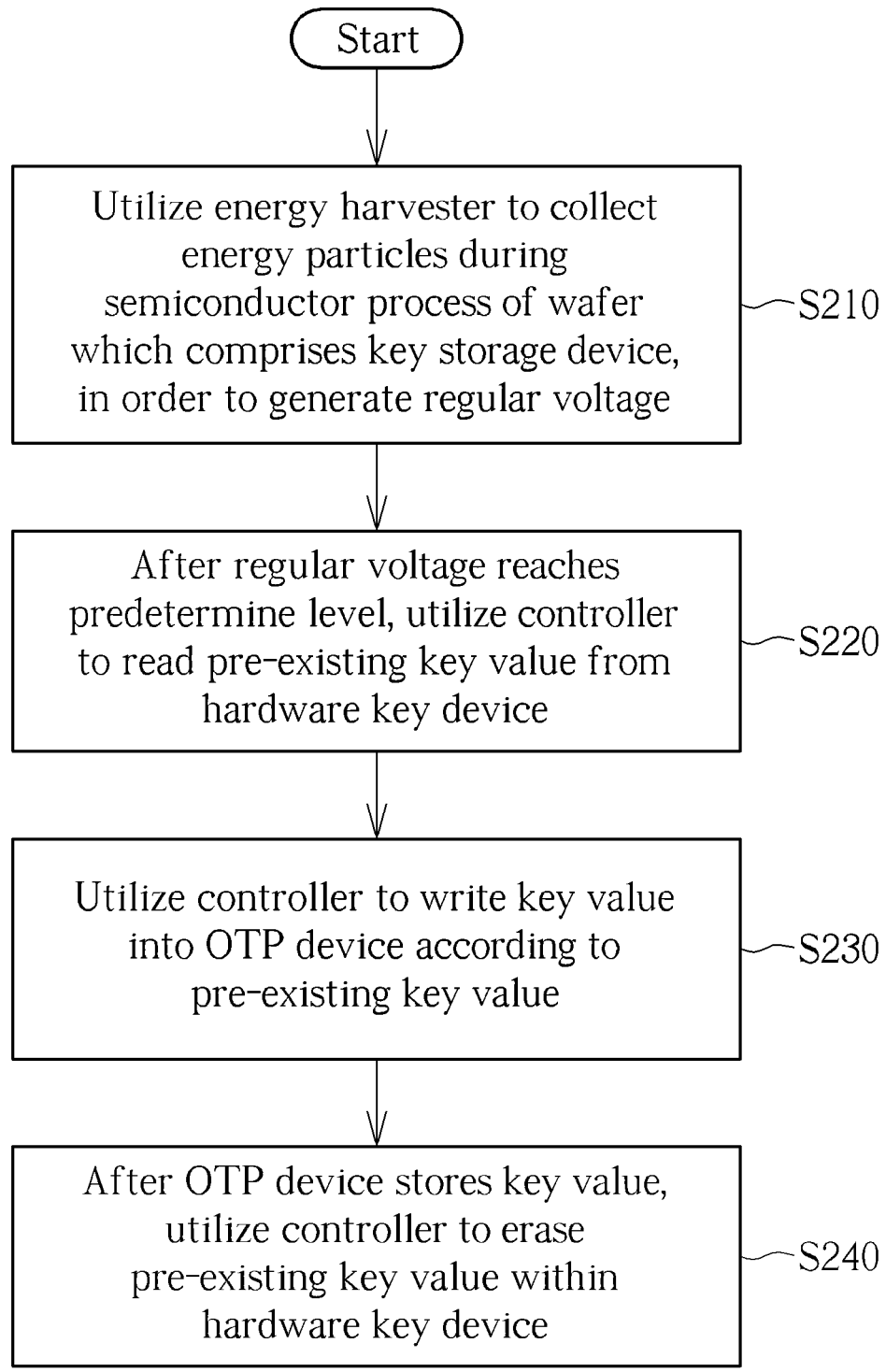
FIG. 2 is a diagram illustrating a working flow of a method for writing a key value into an one-time-programmable device according to an embodiment of the present invention.

FIG. 2 is a diagram illustrating a working flow of a method for writing a key value into an OTP device (e.g. the OTP device 150 shown in FIG. 1) according to an embodiment of the present invention, wherein the method is applicable to a key storage device (e.g. the key storage device 100 shown in FIG. 1), and the key storage device comprises the OTP device. It should be note that the working flow shown in FIG. 2 is for illustrative purposes only, and is not meant to be a limitation of the present invention. For example, one or more steps may be added, deleted or modified in the working flow shown in FIG. 2. In addition, if a same result can be obtained, these steps do not have to be executed in the exact order shown in FIG. 2.

In Step S210, the key storage device 100 may utilize an energy harvester (e.g. the energy harvester 110 shown in FIG. 1) therein to collect energy particles during a semiconductor process of a wafer which comprises the key storage device 100, in order to generate a regular voltage.

In Step S220, after the regular voltage reaches a predetermine level, the key storage device 100 may utilize a controller (e.g. the controller 120 shown in FIG. 1) therein to read a pre-existing key value from a hardware key device 140 (e.g. the metal key storage device) therein.

In Step S230, the key storage device may utilize the controller 120 to write the key value into the OTP device according to the pre-existing key value.

In Step S240, after the OTP device stores the key value, the key storage device may utilize the controller to erase the pre-existing key value within the hardware key device.

Figure 3:
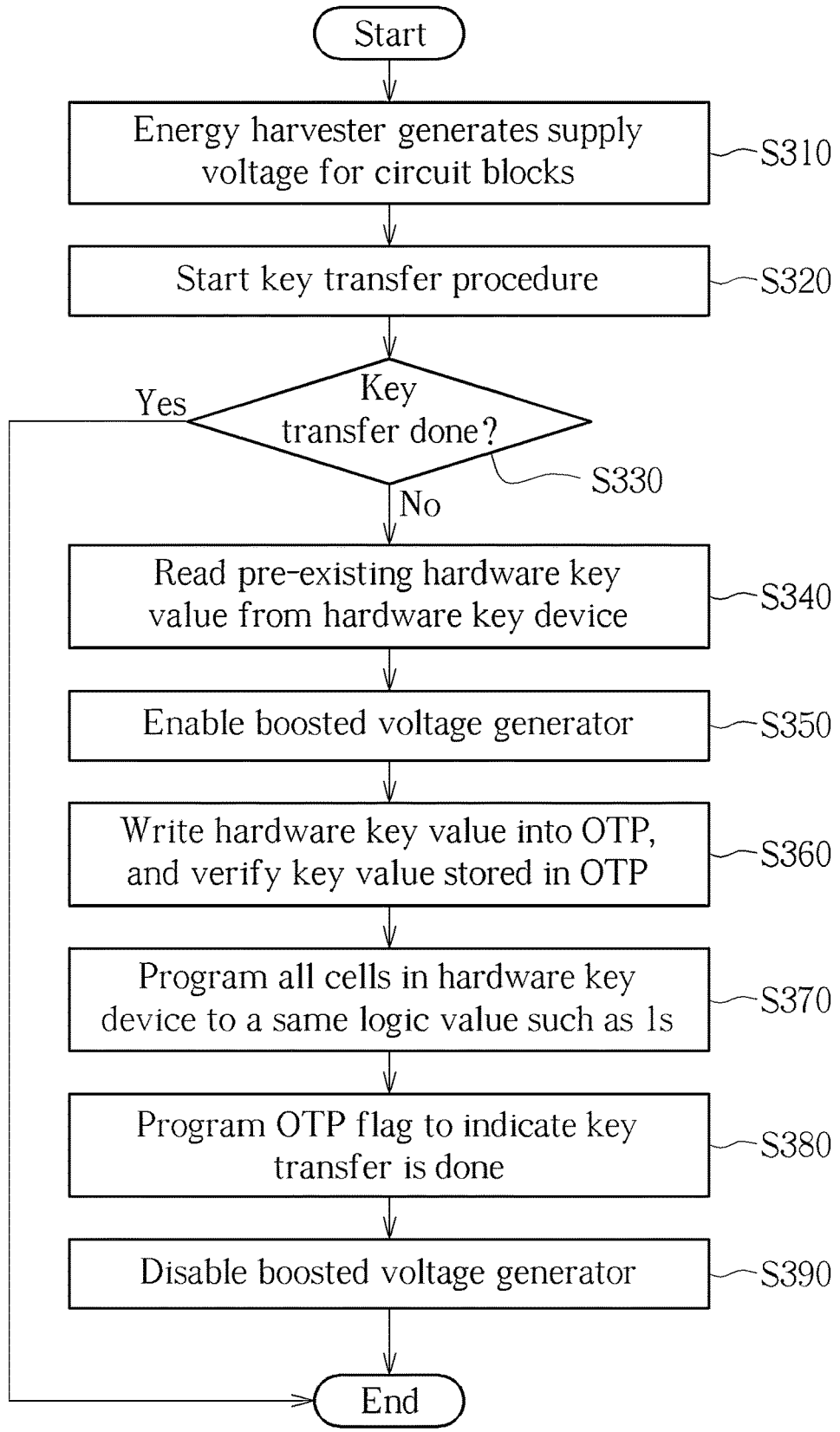
FIG. 3 is a diagram illustrating a detailed working flow of the method shown in FIG. 2 according to an embodiment of the present invention.

FIG. 3 is a diagram illustrating a detailed working flow of the method shown in FIG. 2 according to an embodiment of the present invention. It should be note that the working flow shown in FIG. 3 is for illustrative purposes only, and is not meant to be a limitation of the present invention. For example, one or more steps may be added, deleted or modified in the working flow shown in FIG. 3. In addition, if a same result can be obtained, these steps do not have to be executed in the exact order shown in FIG. 3.

In Step S310, the energy harvester 110 which collects high-energy plasma ions such as plasma ions may generate a supply voltage (e.g. the regular voltage mentioned above) for circuit blocks such as the boosted voltage generator 130, the hardware key device 140 and the OTP device 150.

In Step S320, the controller 120 may start the key transfer procedure in response to the supply voltage generated by the energy harvester reaching a predetermine level.

In Step S330, the controller 120 may check whether the key transfer procedure is done or not by referring the flag of the OTP device 150. If the check result shows "Yes", the working flow ends. If the check result shows "No", the working flow proceeds with Step S340.

In Step S340, the controller 120 may read a pre-existing hardware key value from a hardware key device 140 (e.g. metal key storage device).

In Step S350, the controller 120 may enable the boosted voltage generator 130 to generate the boosted voltage.

In Step S360, the controller 120 may write the pre-existing hardware key value into the OTP device 150 and verify the key value stored in the OTP device 150.

In Step S370, the controller 120 may program all cells in the hardware key device 140 to a same logic value such as 1s.

In Step S380, the controller 120 may program the flag of the OTP device 150 (which may be referred to as "OTP flag" for brevity) to indicate that the key transfer procedure is done.

In Step S390, the controller 120 may disable the boosted voltage generator 130, and the working flow ends.

To summarize, the key storage device and the method provided by the embodiment of the present invention utilize an energy harvester to collect high-energy plasma ions (which is utilized for reactive ion etching during a semiconductor fabrication process) to generate a supply voltage for key transfer devices (e.g. the controller 120, the boosted voltage generator 130, the hardware key device 140 and the OTP device 150). Thus, the key transfer procedure can be done during the semiconductor fabrication process without providing the key value to a third party, thereby prevent the risk of having side-channel attacks while programming keys. In addition, the pre-existing key within the fuse-like storage device can be destroyed after the key transfer procedure is done, and the key value stored in the OTP device is invisible, which greatly improve security in comparison with related arts. Furthermore, special facility (e.g. a secure environment for programming the key value) and additional testing time are not required. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A key storage device, comprising:
    an energy harvester, configured to collect energy particles during a fabrication process of a wafer which comprises the key storage device, in order to generate a regular voltage;
    a controller, coupled to the energy harvester, configured to enable a key transfer procedure when the regular voltage reaches a predetermine level;
    a hardware key device, coupled to the controller, configured to provide a pre-existing key value;
    an one-time-programmable (OTP) device, coupled to the controller;
    wherein:
        the controller reads the pre-existing key value from the hardware key device, and writes a key value into the OTP device according to the pre-existing key value; and
        after the OTP device stores the key value, the controller erases the pre-existing key value within the hardware key device.

2. The key storage device of claim 1, wherein the key storage device is implemented on previously fabricated metal layers, the energy particles collected by the energy harvester are configured for fabrication of at least one subsequently fabricated metal layer, and the previously fabricated metal layers are fabricated before the at least one subsequently fabricated metal layer.

3. The key storage device of claim 1, further comprising:
    a boosted voltage generator, configured to generate a boosted voltage according to the regular voltage when the controller enable the key transfer procedure.

4. The key storage device of claim 3, wherein the controller writes the key value into the OTP device with aid of the boosted voltage.

5. The key storage device of claim 3, wherein the controller erases the pre-existing key value within the hardware key device with aid of the boosted voltage.

6. The key storage device of claim 3, wherein the boosted voltage comprises a first boosted voltage and a second boosted voltage, and the controller writes the key value into the OTP device with aid of the first boosted voltage and erases the pre-existing key value within the hardware key device with aid of the second boosted voltage.

7. The key storage device of claim 1, wherein the controller erases the pre-existing key value within the hardware key device by programming all cells of the hardware key device to be a same logic value.

8. The key storage device of claim 1, wherein each of cells of the hardware key device is either in an initial state or in a final state, each cell in the final state is unable to be reversed to the initial state, and after the OTP device stores the key value, the controller programs all of the cells in the initial state to the final state.

9. The key storage device of claim 1, wherein after the controller writes the key value into the OTP device, the controller verifies whether the key value read from the OTP device matches the pre-existing key value read from the hardware key device.

10. The key storage device of claim 1, wherein after the controller writes the key value into the OTP device, the controller further programs a flag in the OTP device to indicate completion of the key transfer procedure.

11. A method for writing a key value into an one-time-programmable (OTP) device, wherein the method is applicable to a key storage device, the key storage device comprises the OTP device, and the method comprises:
    utilizing an energy harvester of the key storage device to collect energy particles during a semiconductor process of a wafer which comprises the key storage device and to generate a regular voltage accordingly;
    after the regular voltage reaches a predetermine level, utilizing a controller of the key storage device to read a pre-existing key value from a hardware key device of the key storage device;
    utilizing the controller to write the key value into the OTP device according to the pre-existing key value; and
    after the OTP device stores the key value, utilizing the controller to erase the pre-existing key value within the hardware key device.

12. The method of claim 11, wherein the key storage device is implemented on previously fabricated metal layers, the energy particles collected by the energy harvester are configured for fabrication of at least one subsequently fabricated metal layer, and the previously fabricated metal layers are fabricated before the at least one subsequently fabricated metal layer.

13. The method of claim 11, further comprising:
    utilizing a boosted voltage generator of the key storage device to generate a boosted voltage according to the regular voltage.

14. The method of claim 13, wherein an operation of writing the key value into the OTP device is performed with aid of the boosted voltage.

15. The method of claim 13, wherein an operation of erasing the pre-existing key value within the hardware key device is performed with aid of the boosted voltage.

16. The method of claim 13, wherein the boosted voltage comprises a first boosted voltage and a second boosted voltage, an operation of writing the key value into the OTP device is performed with aid of the first boosted voltage, and an operation of erasing the pre-existing key value within the hardware key device is performed with aid of the second boosted voltage.

17. The method of claim 11, wherein utilizing the controller to erase the pre-existing key value within the hardware key device comprises:
    programming all cells of the hardware key device to be a same logic value.

18. The method of claim 11, wherein each of cells of the hardware key device is either in an initial state or in a final state, each cell in the final state is unable to be reversed to the initial state, and utilizing the controller to erase the pre-existing key value within the hardware key device comprises:
    programing all of the cells in the initial state to the final state.

19. The method of claim 11, further comprising:
    after the controller writes the key value into the OTP device, utilizing the controller to verify whether the key value read from the OTP device matches the pre-existing key value read from the hardware key device.

20. The method of claim 11, further comprising:
    after the controller writes the key value into the OTP device, the controller further programs a flag in the OTP device to indicate completion of the key transfer procedure.

* * * * *